(12) United States Patent
Shwartz et al.

(10) Patent No.: US 9,121,133 B2
(45) Date of Patent: Sep. 1, 2015

(54) DIGITALLY PRINTED APPLIQUE AND METHOD OF MAKING SAME

(71) Applicants: Kenneth A. Shwartz, Mattapoisett Neck Road, MA (US); Charles W. Lord, Mattapoisett, MA (US)

(72) Inventors: Kenneth A. Shwartz, Mattapoisett Neck Road, MA (US); Charles W. Lord, Mattapoisett, MA (US)

(73) Assignee: New Wave Group Licensing S.A., Corttaillod (CH)

( * ) Notice: Subject to any disclaimer, the term of this patent is extended or adjusted under 35 U.S.C. 154(b) by 0 days.

(21) Appl. No.: 14/162,651

(22) Filed: Jan. 23, 2014

(65) Prior Publication Data
US 2014/0196843 A1    Jul. 17, 2014

Related U.S. Application Data

(63) Continuation-in-part of application No. 12/833,339, filed on Jul. 9, 2010, now abandoned.

(51) Int. Cl.
| | |
|---|---|
| *A42B 1/00* | (2006.01) |
| *D06Q 1/00* | (2006.01) |
| *B23K 26/00* | (2014.01) |
| *B44C 1/10* | (2006.01) |
| *B44C 1/22* | (2006.01) |
| *D06P 5/30* | (2006.01) |
| *D06Q 1/12* | (2006.01) |

(52) U.S. Cl.
CPC .............. *D06Q 1/00* (2013.01); *B23K 26/0021* (2013.01); *B44C 1/105* (2013.01); *B44C 1/228* (2013.01); *D06P 5/30* (2013.01); *D06Q 1/12* (2013.01); *Y10T 156/1062* (2015.01)

(58) Field of Classification Search
CPC ....................................................... A62B 1/248
USPC ............. 2/195.1, 244, 245, 246, 171, 209.13; 101/34, 93.07, 490
See application file for complete search history.

(56) References Cited

U.S. PATENT DOCUMENTS

| | | | |
|---|---|---|---|
| 4,038,123 | A | 7/1977 | Sammis |
| 5,005,219 | A | 4/1991 | Diaz |
| 5,359,733 | A | 11/1994 | Brannon et al. |
| 5,359,734 | A | 11/1994 | Rathburn |
| 5,422,173 | A | 6/1995 | Stahl |
| 5,701,607 | A | 12/1997 | Kaiser |
| 5,840,408 | A | 11/1998 | Giansetto |
| 5,914,176 | A | 6/1999 | Myers |
| 5,983,400 | A | 11/1999 | Kronenberger |
| 6,067,660 | A | 5/2000 | Contini |

(Continued)

FOREIGN PATENT DOCUMENTS

| | | |
|---|---|---|
| JP | 61120598 | 6/1986 |
| KR | 20000036896 | 7/2000 |

(Continued)

OTHER PUBLICATIONS

International Search Report and Written Opinion for International Application No. PCT/2011/040322 dated Feb. 17, 2012.

*Primary Examiner* — Tejash Patel
(74) *Attorney, Agent, or Firm* — Lane Powell PC (57) ABSTRACT

An applique is provided that is attached to the outer surface of a product. The applique comprises a decorative piece including an upper surface with a design element digitally printed thereon and an opposite lower surface attached to the product.

11 Claims, 7 Drawing Sheets

(56) References Cited

U.S. PATENT DOCUMENTS

| | | | |
|---|---|---|---|
| 6,418,562 B1 | 7/2002 | Shwartz et al. | |
| 6,449,773 B1 | 9/2002 | Shwartz et al. | |
| 6,718,895 B1 | 4/2004 | Fortuna | |
| 6,766,538 B2 | 7/2004 | Park | |
| 6,883,449 B2 | 4/2005 | Burrell et al. | |
| 7,073,206 B2 | 7/2006 | Yan | |
| 7,191,702 B2 | 3/2007 | Kercher | |
| 7,629,400 B2 * | 12/2009 | Hyman | 524/106 |
| 7,947,357 B2 | 5/2011 | Bauer et al. | |
| 8,241,727 B2 | 8/2012 | Nelson | |
| 8,376,805 B2 * | 2/2013 | Komorous-Towey et al. | 446/369 |
| 2004/0205878 A1 | 10/2004 | Goldsby et al. | |
| 2005/0188447 A1 | 9/2005 | Gray | |
| 2006/0117463 A1 | 6/2006 | Spinelli | |
| 2006/0212993 A1 | 9/2006 | Wang | |
| 2007/0190298 A1 | 8/2007 | Hampden-Smith et al. | |
| 2007/0250988 A1 | 11/2007 | Hwang | |
| 2007/0256213 A1 | 11/2007 | Dunavin | |
| 2007/0281136 A1 | 12/2007 | Hampden-Smith et al. | |
| 2009/0025123 A1 | 1/2009 | Weedlun et al. | |
| 2009/0119818 A1 | 5/2009 | Ngo et al. | |
| 2009/0126073 A1 | 5/2009 | Lovett | |
| 2009/0136866 A1 | 5/2009 | Kronzer | |
| 2009/0260131 A1 | 10/2009 | Kim | |
| 2009/0280290 A1 | 11/2009 | Weedlun | |
| 2010/0024091 A1 | 2/2010 | Mehtab et al. | |
| 2010/0035029 A1 | 2/2010 | Ngo et al. | |
| 2010/0107319 A1 | 5/2010 | Yudkin | |
| 2010/0178445 A1 | 7/2010 | Shen et al. | |
| 2011/0165374 A1 | 7/2011 | Nelson | |
| 2011/0195234 A1 | 8/2011 | Nelson | |

FOREIGN PATENT DOCUMENTS

| | | |
|---|---|---|
| KR | 202009000408 | 5/2009 |
| KR | 20090083577 | 8/2009 |

\* cited by examiner

DIGITALLY PRINTED APPLIQUE AND METHOD OF MAKING SAME

CROSS-REFERENCE TO RELATED APPLICATIONS

This application is a continuation-in-part of and claims priority from U.S. patent application Ser. No. 12/833,339, filed Jul. 9, 2010, which is incorporated by reference as if fully set forth herein.

BACKGROUND OF THE INVENTION

The present application relates generally to decorative items and, more particularly, to appliques. Appliques are decorations or designs that are applied on top of larger surfaces of apparel and other products. Appliques can be used to customize apparel, and can bear emblems and insignia particular to events or organizations. Conventionally, appliques bearing emblems or insignia are embroidered.

Appliques can be used to create items which commemorate events such as athletic contents. Commemorative items which are particular to the outcome of an event, such as those featuring the winner, are desirable. Fans in attendance at the event are also often particularly interested in purchasing commemorative items at the contest. Items which display details about the contest such as a final score would be particularly desirable. However, conventional means do not permit the creatFion of such items, as current processes are too time consuming and/or require complex equipment which cannot be ported to the location of an athletic contest. Accordingly, there is a need for a method of quickly and efficiently producing customized commemorative items using equipment which can transported and operated outside of a traditional production setting.

SUMMARY OF THE INVENTION

Disclosed herein is a method of affixing a decorative article to a product comprising preparing at first set of instructions executable by a processor electrically interconnected with a digital printer wherein said first set of instructions is adapted to direct said printer to print a plurality of design elements and at least two intersecting lines bordering said design elements on at least two sides; preparing a second set of instructions executable by a processor electrically interconnected with a laser cutter wherein said second set of instructions is adapted to direct said laser cutter to cut said material into at least one decorative article, said decorative article comprising at least one design element; digitally printing said plurality of design elements and said least two intersecting lines on an upper surface of a sheet of material using a digital printer, said digital printer being directed by said first set of instructions; manually aligning said sheet of material on the cut bed of a laser cutter such that at least one of said at least two intersecting lines is aligned with one edge of said cut bed; cutting said material into at least one decorative article with said laser cutter, said decorative article comprising at least one said design element, said laser cutter being directed by said second set of instructions; and securely attaching said decorative article to said product.

Various embodiments of the invention are provided in the following detailed description. As will be realized, the invention is capable of other and different embodiments, and its several details may be capable of modifications in various respects, all without departing from the invention. Accordingly, the drawings and description are to be regarded as illustrative in nature and not in a restrictive or limiting sense, with the scope of the application being indicated in the claims.

The foregoing and other objectives, features, and advantages of the invention will be more readily understood upon consideration of the following detailed description of the invention taken in conjunction with the accompanying drawings.

DETAILED DESCRIPTION

Figure 1A:
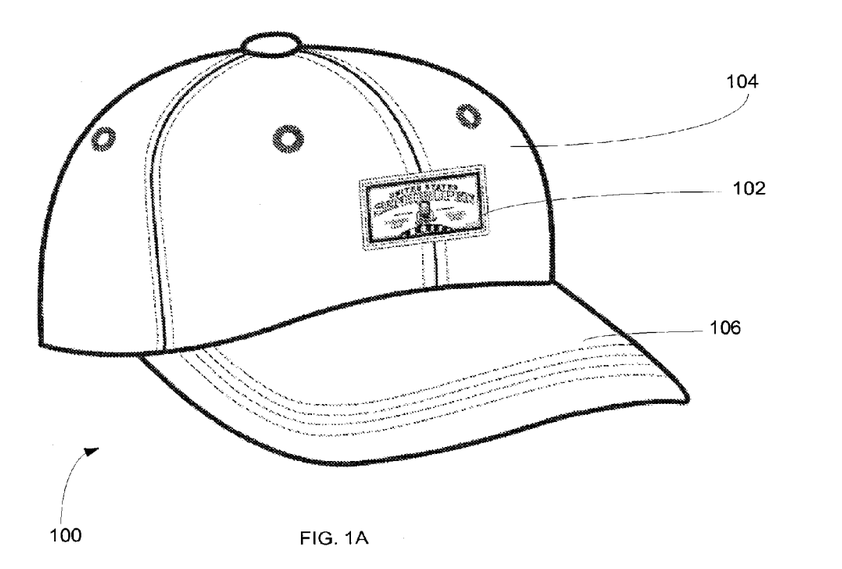
FIG. 1A is an illustration of an exemplary product on which an applique in accordance with one or more embodiments has been applied.

FIG. 1 illustrates an example of a product (in this case a baseball-type cap) 100, on which a digitally printed applique 102 in accordance with one or more embodiments has been applied. The cap 100 includes a crown portion 104 (defining an opening for receiving a portion of a wearer's head) and a hat bill or brim 106 attached to the crown portion 104. In this example, the applique 102 is affixed to the outer surface of the crown portion 104 near the bill 106, although it may be placed generally anywhere on the cap.

The cap 100 shown in FIG. 1 is just one example of a product on which a digitally printed applique 102 in accordance with one or more embodiments can be applied. For example, appliques in accordance with various embodiments can be applied to a variety of other headwear, including, e.g., visors. Furthermore, the appliques can be applied to a variety of other products including, but not limited to, apparel (e.g., shirts, pants, and jackets) and other products such as shoes, scarves, towels (e.g., golf towels), and carrying items, including backpacks. In general, the appliques can be applied to virtually any product to provide a decorative or identifying effect.

Figure 1B:
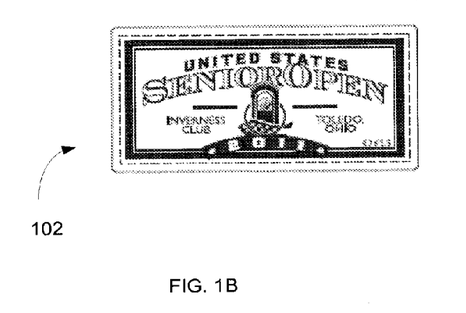
FIGS. 1B and 1C are illustrations of exemplary appliques in accordance with one or more embodiments.
Figure 1C:
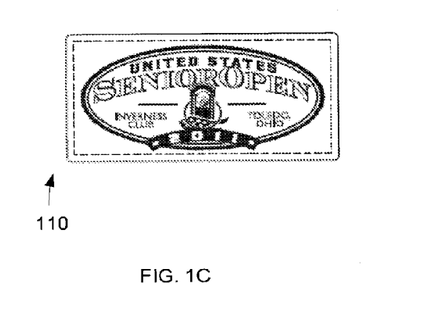

FIG. 1B is an enlarged view of the applique 102 shown in FIG. 1A. FIG. 1C illustrates an example of another applique 110 in which the substrate layer does not conform to the shape of the printed design piece as will be discussed further below.

FIGS. 2A-2G illustrate, by way of example, a process of producing and applying an applique in accordance with one or more embodiments.

Figure 2A:
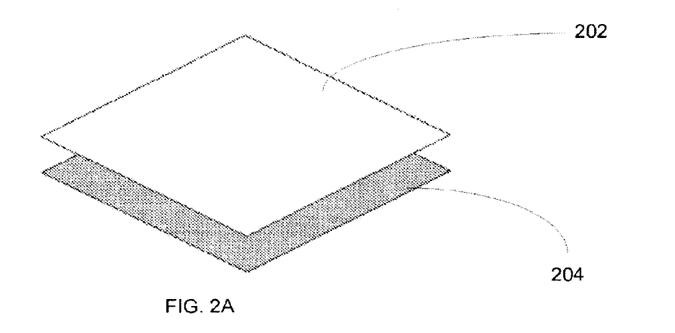
FIGS. 2A-2G are illustrations of an exemplary process of producing and applying an applique in accordance with one or more embodiments.
Figures 2B, 2C:
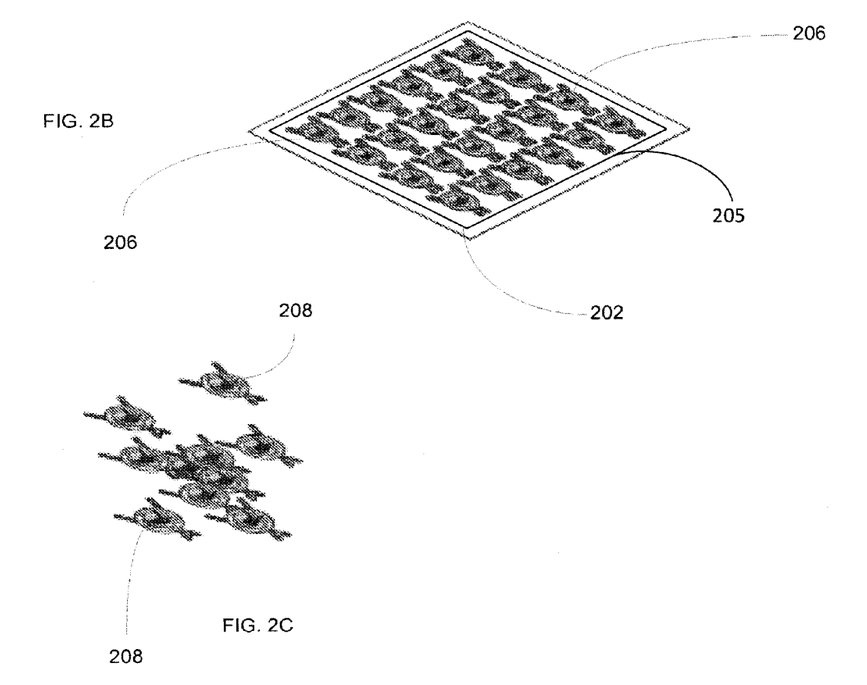

FIG. 2A illustrates a sheet of material 202, on the upper surface of which design elements or images can be digitally printed (as shown in FIG. 2B). As described below, the sheet of material 202 forms the upper layer of an applique.

The sheet of material 200 can comprise a variety of materials on which images can be digitally printed. In one or more embodiments, the sheet of material comprises a canvas material. The sheet of material 200 can also comprise many other materials on which images can be printed including, without limitation, woven material such as cotton twill, nylon, or faux-suede, as well as non-woven material such as felt, leather, suede, rubber, pellon, scrim-felt, molded or sheet rubber, molded or sheet plastic, or faux-leather.

An adhesive material 204 is provided on the lower surface of the sheet of material 202. In the illustrated embodiment, the adhesive material is a heat activated adhesive sheet (e.g., a "low temperature" heat fuseable material) that is lightly fused to the back of the sheet of material 202. A variety of other adhesive materials can also be used to provide a secure bond between the material 202 and a substrate. It should be noted that the adhesive backing 204 is optional; as discussed below, various other attachment techniques can be used including, e.g., using spray/liquid adhesives and sheet/tape adhesives, and stitching.

FIG. 2B illustrates the sheet of material 202 having multiple exemplary design elements 206 digitally printed on the top surface of the sheet 202. The design elements can be of varying sizes and shapes. The design elements are preferably printed using a digital garment or fabric printer, and the sheet can be heat cured to set the inks used in the printing process. Such printers can include inkjet printers that dispense garment colorfast inks. One example of a suitable printer is a model HM1-C printer available from SWF East of Tampa, Fla. Many other printers from various manufacturers can also be used. The printer is guided by electronic instructions which are read by one or more processors associated with the printer. This set of instructions can be called a print file. The print file contains information regarding the design elements such as size and color, as well as other information regarding what is to be printed during the printing process.

The design elements 206 can also be transferred to the sheet of material 202 using a heat "transfer" process wherein a design digitally printed on a transfer material is heat-pressed or ironed-onto the material 202. Examples of possible transfer materials include, but are not limited to, heat transfer papers available from New Milford Photo and PVC FlexWear.™., PVC Neon FlexWear.™., and PolyU FlexWear.™. transfer materials available from T-ShirtSupplies.com.

The sheet of material 202 is cut around the perimeter of each of the design elements 206 to obtain multiple decorative pieces 208 as shown in FIG. 2C. The sheet of material 202 is preferably cut using a laser cutter, which allows intricate shapes to be quickly, easily, and accurately cut. However, it is also possible to use mechanical and other cutting processes including, e.g., die cutting using a sharp metal tool formed into the shape of the decorative pieces. Die cutting is particularly advantageous for reducing labor and time expenditure in producing large quantities of decorative pieces.

While it is known in the art to produce items decorated with embroidered appliques, those appliques can be cut first and then embroidered after they are affixed to the item. In other words, a piece of blank fabric is typically cut out and affixed to an item such as a hat, and then the design element is embroidered onto the material on the hat. Because the pieces of fabric are blank, the cutting process need not be as precise. The alignment of the piece of fabric with the laser bed or cut file is not critical. However, it is not possible to digitally print an applique after it is affixed to an item such as a hat. Instead, the appliques, or decorative pieces, must be printed first, then cut out after printing, and then affixed to items. This order of steps presents unique challenges.

As shown in FIG. 2C, many decorative pieces are printed on a single sheet of material as directed by the print file, and after printing, each decorative piece must be precisely cut out. The laser must be very accurate—it can neither cut into the shape of a design element nor leave an excess of material around the design material of a decorative piece. Many design elements are typically printed upon and must be cut from a single sheet of material, and so an imprecise cut can ruin more than one design element printed on a single sheet. Optical means are traditionally used to provide camera based guidance to the cut laser in order to provide the additional necessary accuracy. However, an optical means of controlling a laser cutter may or may not be available on a laser cutter which is transportable to a site which is not a traditional manufacturing location, such as a stadium or other sporting event venue. The laser cutter should be guided exclusively with the cut file, or computer readable set of instructions which direct the laser's movements. A cutting method that can be faithful to the shapes of dozens of appliques on a sheet of material without the use of optical or camera-based control mechanisms would be advantageous.

In order to accomplish this, in accordance with one or more aspects of the invention disclosed herein intersecting lines 205 which border the plurality of design elements on at least two sides, such as lines making up two sides of a square or a rectangle which circumscribes the plurality of design elements, as shown in FIG. 2B, may be printed on the sheet of material. Data relating to the lines should be present in the same print file as data relating to the design elements. One edge of the shape or one intersecting line may be manually aligned, or positioned by a user by hand, with one edge of the laser cutter bed. This alignment ensures that it is positioned so that the printed substrate is parallel to the edge of the laser bed so as to orient the material to the laser cutter and the cut file. This ensures accuracy of cutting without a need for a camera or optical guidance mechanism on the laser cutter. The laser beam can then be aligned with the bottom left corner of the shape or the intersection of the two intersecting lines, or alternatively with another corner, such as the top right corner, of a shape. This corner or intersection corresponds to the "start" position in the cut file which guides the action of the laser cutter. Once the "start" position has been manually accomplished, the computer readable instructions present in the cut file can direct the movements of the laser with sufficient accuracy without a need for optical laser guidance. Additionally, information pertaining to the lines should be present in both the print and cut files. This enables the two files to be mathematically aligned. In other words, the lines can act as a reference to the user, the print file, and the cut file.

It is understood that in addition to lines, a variety of shapes, including rectangles or squares, can be used so long as they provide a user with a reference point which can be aligned with the edge of the cutting bed and with the laser beam, and preferably include at least one right angle.

Figure 2D:
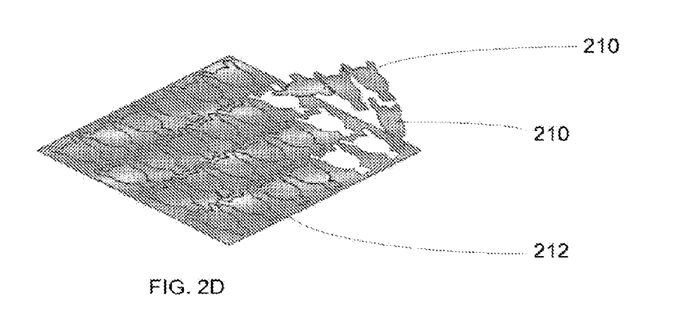

Substrate pieces 210, which are attached to the decorative pieces 208 as described in further detail below, are formed from a sheet of substrate material 212 as illustrated in FIG. 2D. Each of the substrate pieces 210 may have a shape similar to a decorative piece 208 that is slightly larger in size. Alternatively, substrate pieces 210 may have an entirely different shape than the printed pieces 208 as shown, e.g., in FIG. 1C. The sheet of substrate material 212 is preferably cut using a laser cutter, which allows intricate shapes to be quickly, easily, and accurately cut. Mechanical and other cutting processes can also be used including, e.g., die cutting as discussed above.

The sheet of substrate material 212 can comprise a variety of materials. In one or more embodiments, the substrate material comprises felt. The substrate material 212 can also comprise many other materials including, without limitation, woven material such as cotton twill, canvas, nylon, or faux-suede, as well as non-woven material such as leather, suede, rubber, pellon, scrim-felt, molded or sheet rubber, molded or sheet plastic, or faux-leather.

The sheet of substrate material 212 can have multiple plies to provide additional thickness, if desired.

Figure 2E:
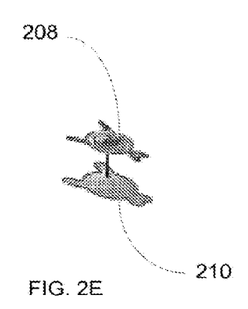

As shown in FIG. 2E, each of the decorative pieces 208 is overlaid on a substrate piece 210. A heat press is used to securely fuse or bond the decorative piece 208 on the substrate piece 210, by activating the heat activated material 204 on the lower surface of each decorative piece 208. It should be understood that other techniques for bonding the decorative piece 208 on the substrate piece 210 can also be used including, e.g., use of spray/liquid adhesives and sheet/tape adhesives. In addition, the decorative piece 208 could be stitched to the substrate piece 210.

Figure 2F:
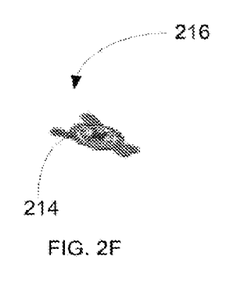

The resulting applique or decorative article 216 is shown in FIG. 2F.

As shown in FIG. 2F, because the substrate piece 210 has an outer shape that corresponds to and is slightly larger than the outer shape of the decorative piece 208, the peripheral portion of the substrate piece 210 extends beyond the periphery of the decorative piece 208 to define a visible border 214.

Figure 2G:
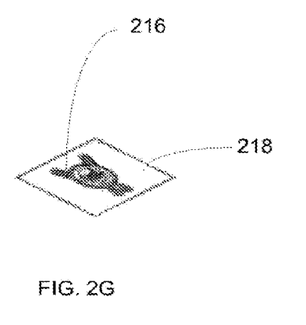

The applique 216 can then be applied to a cap or other product as shown in FIG. 2G. By way of example, the applique 216 is placed on a surface 218 (partially shown) of the product and then stitched to the product, preferably along the border 214. (The stitch, however, does not have to conform to the shape or border of the substrate.) For example, a triple run stitch can be used to a fix the applique 216 to the surface 218 of the product.

Figure 3:
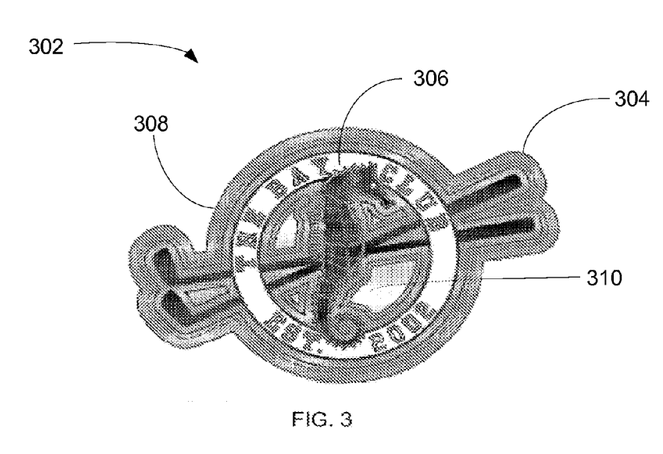
FIG. 3 is an illustration of an exemplary applique having cutout portions in accordance with one or more further embodiments.

FIG. 3 illustrates an applique 302 in accordance with one or more further embodiments. The applique 302 includes a substrate piece 304 (in this example, a felt substrate) and a decorative piece 306 including a digitally printed image. The substrate piece 304 can correspond in shape to and be slightly larger than the decorative piece 306, thereby defining a border 308 around the applique. In this embodiment, both the substrate piece 304 and the decorative piece 306 include corresponding cutouts 310 that allow portions of the product on which the applique 302 is attached to show through to provide an aesthetically appealing effect.

Figure 4:
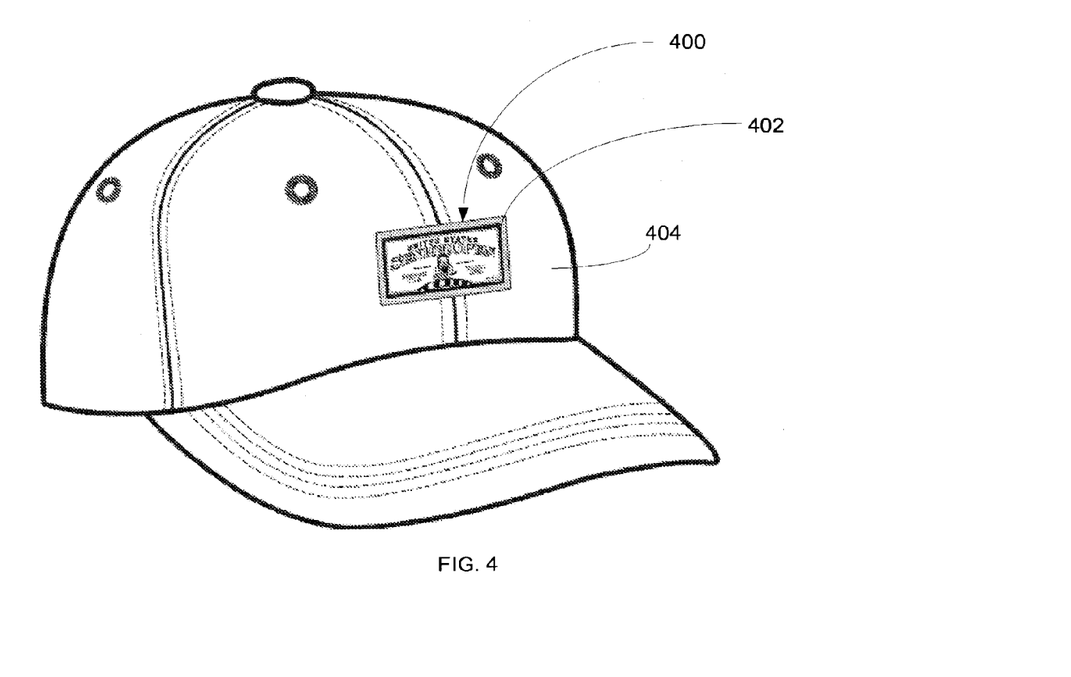
FIG. 4 is an illustration of an exemplary product on which an applique with a substrate layer has been heat fused on a product in accordance with one or more embodiments.

In addition to being stitched to a product, the applique can be heat fused to the product. FIG. 4 illustrates an example of an applique 400 having a substrate layer 402 that is heat fused to the surface of a product 404 (which in this example is a cap).

Figure 5:
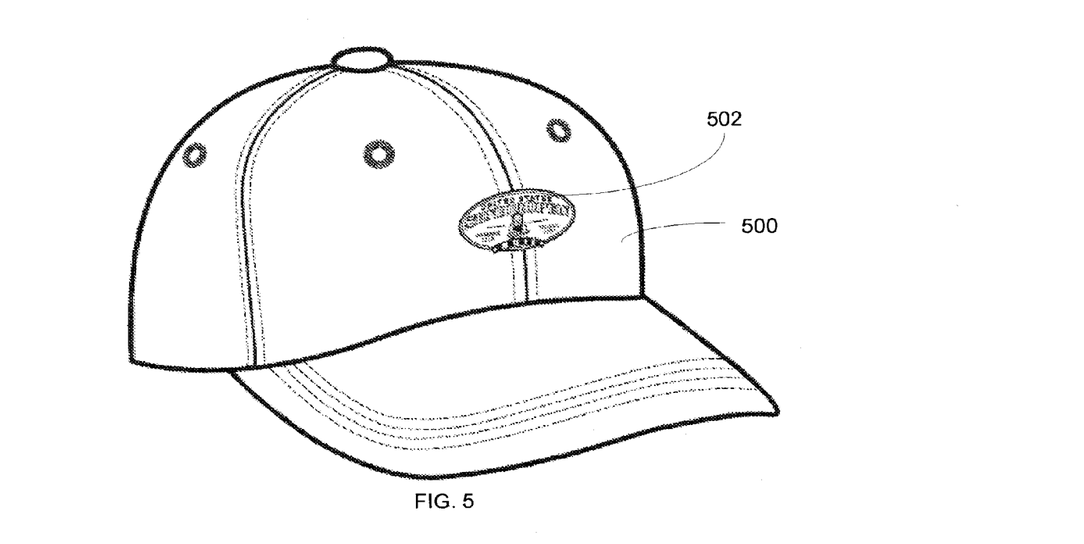
FIG. 5 is an illustration of an exemplary product on which an applique without a substrate layer has been heat fused on a product in accordance with one or more embodiments.
Figure 6:
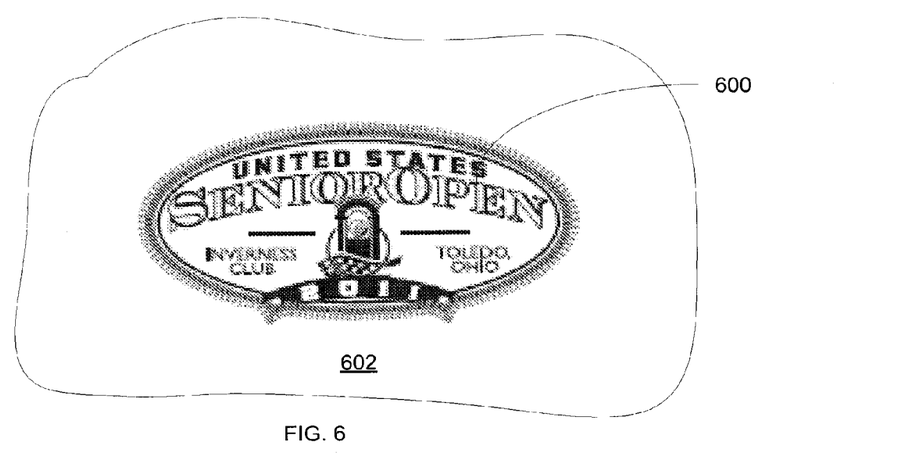
FIG. 6 is an illustration of an exemplary applique without a substrate layer that has been stitched on a product in accordance with one or more embodiments.

In accordance with one or more further embodiments, appliques similar to those described above with respect to FIGS. 1-4 can be produced without a substrate layer. Appliques without a substrate layer can be produced by digitally printing images on a sheet of material as described above with respect to FIG. 2B. The sheet of material on which the images are printed is then cut, preferably using a laser cutter or die cutter, to obtain multiple decorative pieces as described above with respect to the FIG. 2C. Instead of being applied to a substrate piece, the decorative pieces are then directly secured to the surface of a product such as, e.g., items of apparel, shoes, towels, and carrying items. A heat press can be used to securely fuse or bond the decorative piece on the product. FIG. 5 is an example of a product (in this example a cap) 500 on which an applique 502 with a substrate layer has been heat fused. Alternately, other techniques for securely attaching decorative pieces are also available including, e.g., use of spray/liquid adhesives and sheet/tape adhesives and stitching. FIG. 6 is an example of an applique 600 without a substrate layer that has been stitched to a surface 602 of a product.

In accordance with one or more further embodiments, appliques can be produced by first cutting "blank" applique pieces and then printing decorative images on the previously cut pieces. FIGS. 7A-7D illustrate an example of such a process.

Figure 7A:
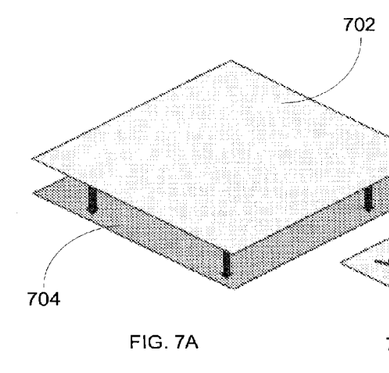
FIGS. 7A-7D are illustrations of an exemplary process of producing an applique that is cut before being printed in accordance with one or more embodiments.

FIG. 7A illustrates a sheet of material 702 similar to the sheet of material 202 shown in FIG. 2A. Design elements or images can be digitally printed on the upper surface of the sheet 702. An adhesive material 704 (like the adhesive material 202) is provided on the lower surface of the sheet of material 702.

Figure 7B:
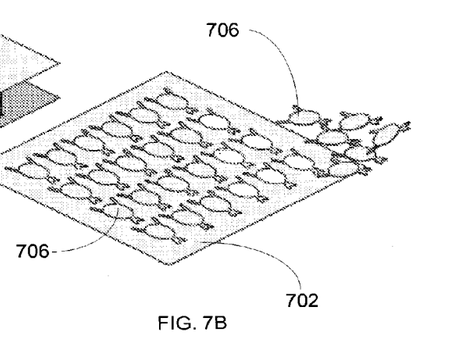

As shown in FIG. 7B, multiple shaped pieces 706 are cut out of the sheet of material 702, preferably using a laser cutter or die cutter.

Figures 7C, 7D:
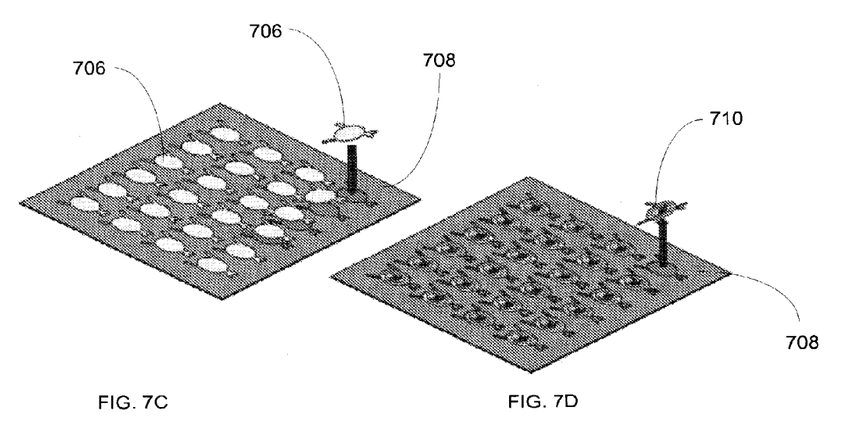

The pieces 706 are then placed into a "jig" or a template 708, which holds them in place during the printing process as shown in FIG. 7C. The jig 708 is mathematically aligned with the print file so that the printed image registers precisely with the small pieces 706.

Then, as shown in FIG. 7D, the pieces 706 are digitally printed. The printed pieces 710 can be heat cured to set the inks used in the printing process.

Thereafter, the printed pieces 710 can be applied to a substrate in a manner similar to that illustrated in FIGS. 2D-2G. The resulting applique with a substrate layer can then be applied to products in various ways including by being stitched or heat fused on products.

The printed pieces 710 can also be directly applied to products (without being attached to a substrate layer) in various ways including by being stitched or heat fused on products.

Figure 8:
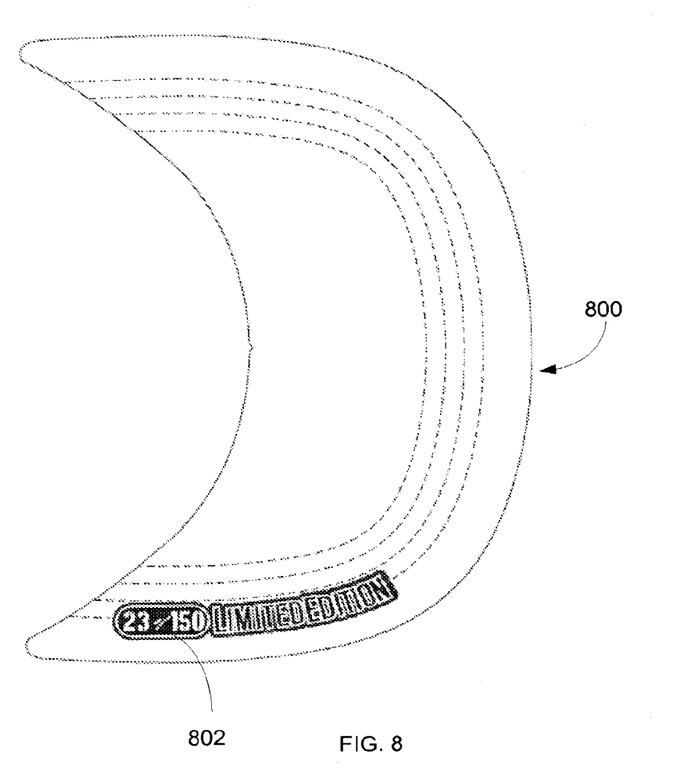
FIG. 8 illustration of an exemplary visor having an applique fused on the bill portion thereof in accordance with one or more embodiments.

One advantage of an applique that is heat fused to a product is that it can be quickly and easily applied to a variety of products including, e.g., the bill of a finished hat or visor. FIG. 8 is an example of a visor bill 800 having an applique 802 heat fused on the upper surface of the bill 800. Stitching or embroidering an applique to a finished hat or visor bill is typically difficult because of the thickness of the bill. Appliques can also be applied to other parts of hats or visors including, e.g., the sides, the front, or the back of hats or visors.

In accordance with one or more embodiments, a plurality of unique design elements can be digitally printed on appliques to customize a set of products. For example, each applique can be printed to include one of a series of numbers in a collection. As shown in the visor example of FIG. 8, each applique can specify a particular number of a limited edition set. In other examples, appliques with unique numbers or other identifiers can be applied on apparel for a sports team, where a unique number or name is provided for each player on the team. Appliques can also commemorate the results of sporting events, including the final score. Using the digital printing techniques described herein, appliques with such unique design elements can be quickly and easily manufactured.

A variety of design elements can be digitally printed on appliques in accordance with one or more embodiments. The digital printing process allows designs and lettering of significantly higher resolution to be produced on appliques than those that are woven or embroidered. In one or more embodiments, the design elements can be photographed images.

Figure 9:
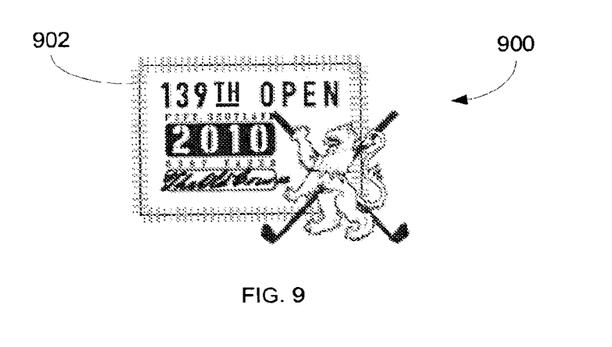
FIG. 9 is illustration of an example of an applique with a printed stitch design in accordance with one or more embodiments.

In accordance with one or more embodiments, the design elements digitally printed on appliques include a printed stitch design at the periphery of the applique, providing the appearance of an embroidered border. FIG. 9 illustrates an example of an applique 900 having a printed stitch design 902.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Having described preferred embodiments of the present invention, it should be apparent that modifications can be made without departing from the spirit and scope of the invention.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method of affixing a decorative article to a product comprising:
   a. preparing a first set of instructions executable by a processor electrically interconnected with a digital printer wherein the first set of instructions is adapted to direct said printer to print onto a sheet of material a plurality of design elements and an at least two intersecting lines bordering said design elements on at least two sides;
   b. preparing a second set of instructions executable by a processor electrically interconnected with a laser cutter wherein the second set of instructions adapted to direct said laser cutter to cut the sheet of material into at least one decorative article, said decorative article comprising at least one design element;
   c. digitally printing said plurality of design elements and the least two intersecting lines on an upper surface of a sheet of material using the digital printer, said digital printer being directed by the first set of instructions;
   d. manually aligning said sheet of material on a cut bed of the laser cutter such that at least one of the at least two intersecting lines is aligned with one edge of said cut bed;
   e. cutting said material to form at least one decorative article with the laser cutter, said decorative article comprising at least one said design element, said laser cutter being directed by the second set of instructions; and
   f. securely attaching said decorative article to said product.

2. The method of claim 1 wherein attaching said decorative article to said product comprises providing a heat activated adhesive material on a lower surface said decorative article and heat fusing said decorative article on the products.

3. The method of claim 1 wherein attaching said decorative article to said product comprises stitching said decorative article onto said product.

4. The method of claim 1 wherein attaching said decorative article to said product comprises attaching a lower surface of said decorative article to one side of a substrate layer, and attaching an opposite side of the substrate layer to the product, the substrate layer being shaped such that a peripheral portion of the substrate layer extends beyond the periphery of said decorative article to define a border.

5. The method of claim 4 wherein attaching said substrate layer to said product comprises stitching said substrate layer to said product.

6. The method of claim 4 wherein attaching said substrate layer to said product comprises heat fusing said opposing side of the substrate layer to the product.

7. The method of claim 1 wherein the product is an item of apparel.

8. The method of claim 1 wherein each of said plurality of design elements is unique.

9. The method of claim 1 further comprising the step of manually orienting said laser with said intersection of said lines.

10. The method of claim 1 wherein said first and said second sets of instructions include data relating to said at least two intersecting lines.

11. The method of claim 10 further comprising mathematically aligning said intersecting lines in said first set of instructions with said intersecting lines in said second set of instructions.

* * * * *